(12) United States Patent
Benetti

(10) Patent No.: US 8,091,576 B2
(45) Date of Patent: Jan. 10, 2012

(54) BY-PASS AND PRESSURE REGULATOR VALVE

(75) Inventor: Arnaldo Benetti, Modena (IT)

(73) Assignee: P.A. S.p.A., Rubiera (IT)

( * ) Notice: Subject to any disclaimer, the term of this patent is extended or adjusted under 35 U.S.C. 154(b) by 806 days.

(21) Appl. No.: 12/171,375

(22) Filed: Jul. 11, 2008

(65) Prior Publication Data

US 2009/0205716 A1 Aug. 20, 2009

(30) Foreign Application Priority Data

Feb. 19, 2008 (IT) .............................. MO2008A0043

(51) Int. Cl.
*G05D 11/00* (2006.01)
(52) U.S. Cl. .......... 137/115.13; 137/115.28; 137/118.01
(58) Field of Classification Search ............. 137/115.13, 137/109, 115.01, 118.01, 115.28, 115.18, 137/513.3
See application file for complete search history.

(56) References Cited

U.S. PATENT DOCUMENTS

| | | | | |
|---|---|---|---|---|
| 3,945,205 A | * | 3/1976 | Atago et al. .................. 60/289 |
| 4,693,273 A | * | 9/1987 | Reynolds et al. ......... 137/596.13 |
| 5,694,966 A | | 12/1997 | Holder | |
| 6,123,509 A | * | 9/2000 | Hung .......................... 417/44.2 |
| 6,916,456 B2 | * | 7/2005 | Martineau et al. ............ 422/295 |
| 2006/0289068 A1 | * | 12/2006 | Miller et al. ............... 137/513.3 |

FOREIGN PATENT DOCUMENTS

| | | |
|---|---|---|
| DE | 3810341 A1 | 9/1989 |
| DE | 4221286 A1 | 1/1993 |
| EP | 0979944 A2 | 2/2000 |

* cited by examiner

*Primary Examiner* — Craig Schneider
*Assistant Examiner* — Jessica Cahill
(74) *Attorney, Agent, or Firm* — Pearne & Gordon LLP

(57) ABSTRACT

A by-pass and pressure regulator valve exhibiting: an inlet mouth and an outlet mouth set in reciprocal communication by a main conduit; a by-pass mouth. The by-pass and pressure regulator valve comprises: an obturator, mobile between at least a closed position, in which it interrupts fluid communication between the main conduit and the by-pass mouth, and at least an open position, in which the fluid communication is not interrupted; operating pressure control means, predisposed to move the obturator from the closed position; means for determining a flow pressure loss in fluids crossing the main conduit, arranged along the main conduit in order to separate a first tract upstream of the main conduit from a second tract downstream thereof; obturator command means governed by a fluid pressure difference between the first tract and the second tract of the main conduit, distinct from the operating pressure control means but operatively connected to the obturator.

8 Claims, 5 Drawing Sheets

BY-PASS AND PRESSURE REGULATOR VALVE

BACKGROUND OF THE INVENTION

The object of the present invention is a by-pass and pressure regulator valve. In particular, the valve is usefully applied internally of hydraulic circuits for high-pressure washing.

High-pressure washing plants generally comprise a piston pump, destined to place a washing fluid under pressure, a valve of the type of the invention and a lever tap valve, commonly called a gun, which is predisposed to enable an operator to control dispensing of the fluid.

Unless electrical devices are included for automatic turning-off of the pump, the pump operates continuously and thus remains in operation even when the gun is turned off by the operator; given the incompressibility of the fluid, it is necessary for it to be discharged into a low-pressure tank through a by-pass conduit. The opening of the conduit it controlled by a valve, simply known as a by-pass or unloader valve.

The valve is also used for control of the operating pressure with the gun open: this is normally done by partializing the opening of the by-pass hole. With the by-pass totally closed, the maximum operating pressure obtainable with the nozzle mounted on the gun is reached; by partially opening the by-pass a lower pressure is obtained. In substance, on exceeding a threshold pressure which can be adjusted, the hydraulic circuit starts to open on the by-pass conduit. In the example, adjustment mechanisms of known type are generally used, being constituted by an obturator maintained in a seating by a pre-loaded spring.

Less sophisticated by-pass valves are commanded by the pressure peak created in the fluid on closing the gun: the fluid is trapped by a check needle which isolates the delivery branch and is used to pilot the opening of the by-pass hole. Devices of this type, however constructionally very simple and reliable they are, exhibit an obvious drawback; the delivery channel upstream of the gun stays at high pressure, with obvious problems in terms of safety and ease of use. With the gun closed, the washing fluid will be maintained at a sufficiently high pressure to keep the by-pass valve open, with pressure levels therefore above the normal working pressure.

Improved by-pass valves, commonly known as reset valves, can be used to solve the above-described problem. They are controlled not by the pressure peak internally of the channel, but by the washing fluid flow directed to the dispensing gun. Valves of this type usually include a device destined to cause a flow pressure loss in the fluid crossing it and a pilot plate governed by the pressure differences generated, which determines the closure of the by-pass branch in response to the flow pressure loss. The flow pressure loss is obviously annulled with the closure of the gun and the consequent interruption of the fluid flow.

Differently to what happens in a normal unloader valve, in a reset valve the delivery conduit is connected to the by-pass even with the gun closed thanks to the absence of the check needle: the pressure peak generated by the interruption of the flow does not thus remain trapped but can be discharged through the by-pass hole which opens in response to the lack of flow. With the gun closed the delivery branch is thus at a pressure which is hardly above atmospheric pressure.

Valves of the described type generally integrate, in a single device, the described pressure reset functions in the delivery branch and an operating pressure control function. A common solution consists in associating an end of the pressure control spring to the pilot plate, and the other end of the spring to the stem which commands the obturator of the valve. In this way, the spring is compressed by the plate only in the presence of a flow pressure loss through the flow conduit; in this configuration it tends to keep the obturator in a position of closure of the by-pass branch and exerts its action of control over the operating pressure. With the spring unloaded, i.e. in the absence of a flow pressure loss, no action is exerted on the obturator to keep it in its seating, so it opens on the by-pass branch at low pressure.

The above-described valve exhibits, however, a substantial problem: to keep the obturator closed the regulator spring has to be contrasted. Since this is usually a rather strong spring, the flow pressure loss generated by the device has to be quite strong. There is a consequent considerable reduction in the dispensing pressure of the washing fluid, which causes a high consumption of energy and leads to problems of overheating in the plant's pump.

Further, as it is always necessary to have large flow pressure loss in order to guarantee the obturator seal on the by-pass seating, plant functioning problems may ensue at low flow rates.

In order to operate with limited flow pressure loss, it is thus necessary to separate the pilot piston from the contrast spring, such that it is only subject to the forces deriving from the pressure differential to which it is subjected. In this case, however, the mechanism is particularly sensitive and has therefore to be calibrated with extreme precision. With respect to this necessity, known-type valves are limited by the variations in the flow pressure loss due to fluctuations in the fluid flow rate and functioning irregularities due to contact of one of the pilot piston surfaces with the fluid in motion.

In some reset valves made according to the prior art, the separating of the contrast spring of the pilot piston for closure of the by-pass is realised by providing two different by-pass holes, possibly connected to one another, closure of which is commanded by two distinct obturators, one of which is governed by the operating pressure regulation device, the other of which is controlled by the mechanism for resetting the pressure on closure of the gun. The presence of two distinct mechanisms leads however to an undesired increase in size and an excessive constructional complexity.

The aim of the by-pass and pressure regulator valve of the present invention is to resolve the above-described drawbacks in the prior art.

The main advantage of the by-pass and pressure regulator valve of the present invention lies in the limited flow pressure loss induced by the passage of the dispensed fluid through the device; this flow pressure loss is comparable in extent to that of a normal unloader valve.

A further advantage of the valve of the invention is its compactness, with positive consequences such as a smaller overall size, a limited number of components and a simplification of the production process therefore.

A further substantial advantage of the device of the present invention relates to the broad range of flows for which it can be used, without any deterioration of the operating performance thereof.

A still further advantage of the invention derives from the easy and accurate calibration of the device which leads to high levels of reliability thereof.

A further advantage of the valve derives from the possibility of associating a micro-switch thereto which is destined to electrically control the turning-off of the pump or other electrical or electromechanical devices of the hydraulic circuit in response to the closure of the dispensing gun.

BRIEF DESCRIPTION OF THE DRAWINGS

Further characteristics and advantages of the invention will better emerge from the detailed description that follows of two preferred but not exclusive embodiments thereof, illustrated by way of non-limiting example in the appended figures of the drawings, in which.

DESCRIPTION OF THE PREFERRED EMBODIMENTS

Figure 1:
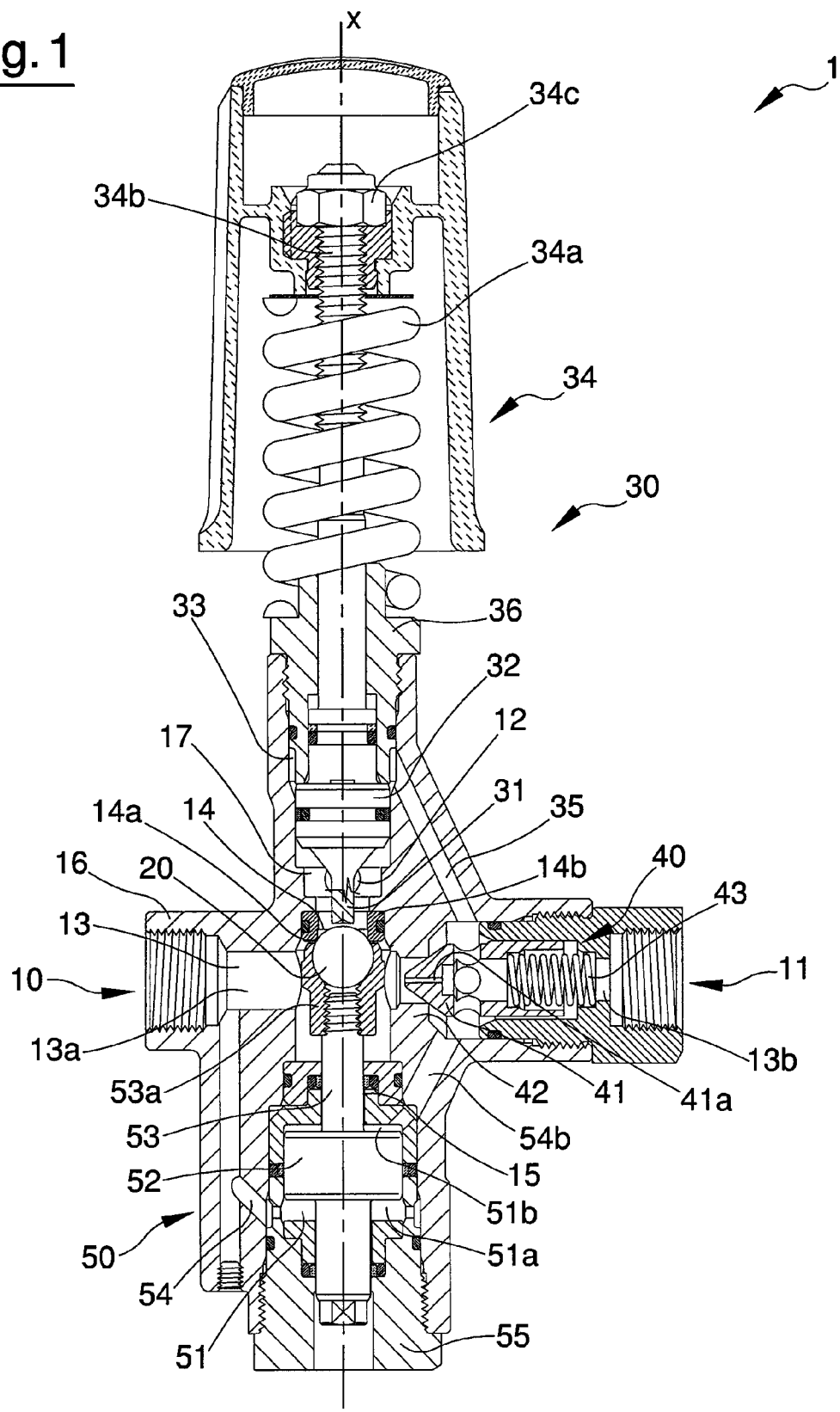
FIG. 1 is a section view of a first embodiment of a by-pass and pressure regulator valve of the present invention.

With reference to the figures of the drawings, 1 denotes a by-pass and pressure regulator valve of the present invention. In particular, the valve is predisposed to reduce the pressure in the delivery branch up to levels just above atmospheric pressure when the gun in the associated circuit is closed, i.e. it is of the type of valves commonly known as reset valves.

The device is illustrated in a preferred operating configuration. The positional relations among elements of the by-pass and pressure regulator valve 1 described herein below in terms of relative height (for example by the use of words such as "lower" or "upper" are to be interpreted at all times with reference to this configuration.

The by-pass and pressure regulator valve 1 of the invention exhibits an inlet mouth 10 and an outlet mouth 11 set in reciprocal communication by a main conduit 13; it is further provided with a by-pass mouth 12.

The by-pass and pressure regulator valve 1 comprises an obturator 20, mobile between at least a closure position, in which it interrupts fluid communication between the main conduit 13 and the by-pass mouth 12, and at least an open position, in which the fluid communication is not interrupted.

The valve further comprises: means for controlling the operating pressure 30, predisposed to move the obturator 20 from the closed position to the open position at fluid pressures inside the main conduit 13 exceeding a threshold level; means for determining a flow pressure loss 40 in the fluid crossing the main conduit 13, arranged along the conduit itself to separate a first tract 13a upstream from a second tract 13b downstream.

The valve is characterised in that it comprises means for commanding the obturator 50, governed by a fluid pressure difference between the first tract 13a and the second tract 13b of the main conduit 13, distinguished from the means for controlling the operating pressure 30 but operatively connected to the obturator 20, the means being predisposed to exert thereon an action which will maintain the obturator 20 in the closed position at a fluid pressure in the first tract 13a which is greater than a pressure in the second tract 13b.

Figure 5:
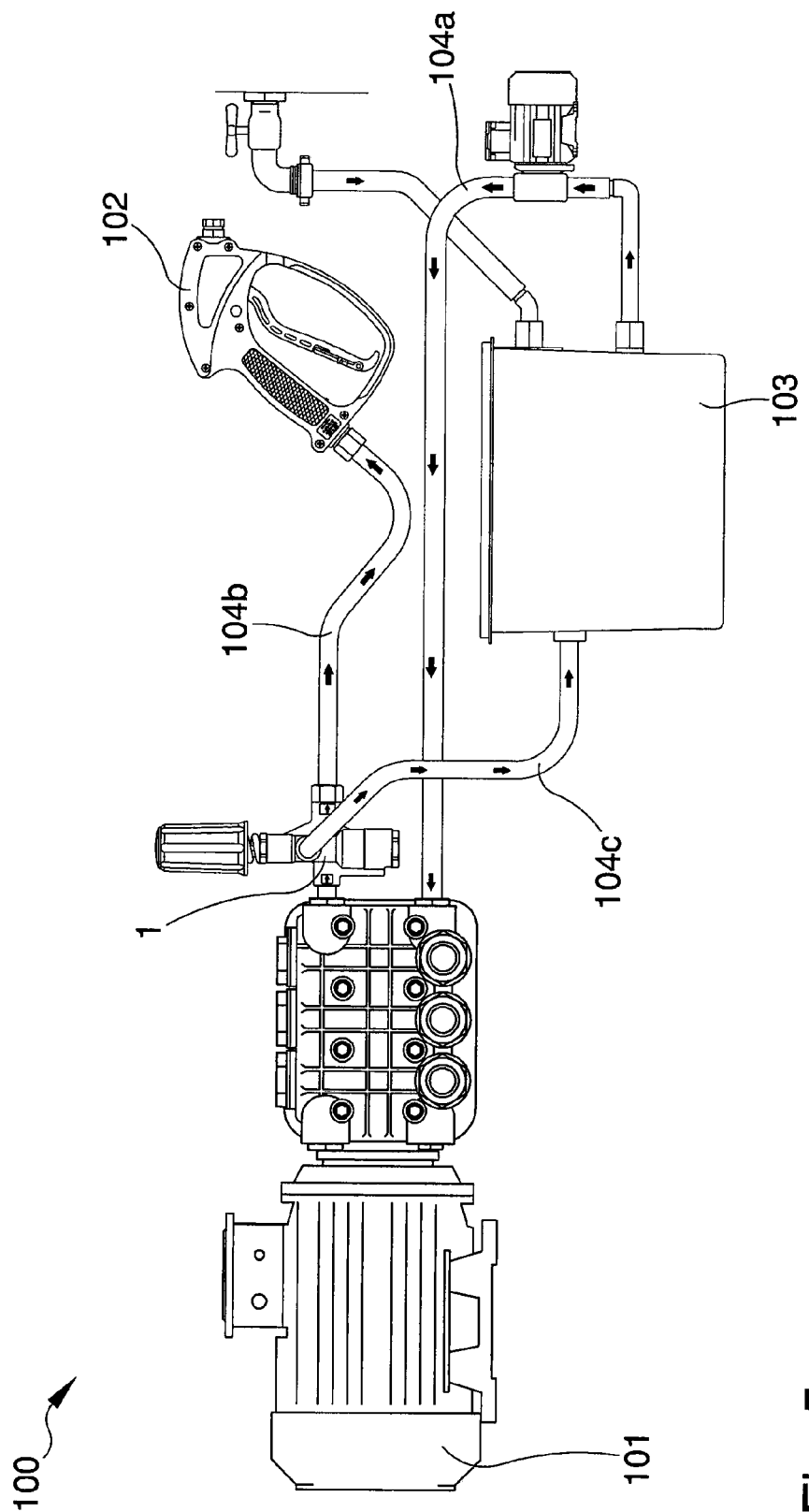
FIG. 5 is one of the possible hydraulic pressure-washing plant schemes of the present invention.

As previously discussed, the described by-pass and pressure regulator valve 1 is preferably used as a by-pass and pressure regulator valve for hydraulic pressurised washing plants 100. These plants, illustrated in FIG. 5 in one of the possible embodiments, comprise means for pumping 101 the washing fluid, generally constituted by a piston pump, and means for dispensing 102 the fluid, preferably constituted by a dispensing gun. A conduit 104a supplies the means for pumping, in the plant of FIG. 5, sourcing the fluid from a low-pressure tank 103. In applications of this type, the by-pass and pressure regulator valve 1 can be mounted directly on the pump head (the constructional solution illustrated in FIG. 5) or can be connected thereto by means of a special conduit therefore. Further associated to the to the by-pass and pressure regulator valve are: a delivery conduit 104b, which connects the outlet mouth 11 to the means for dispensing 102 and a low-pressure by-pass conduit 104c associated to the by-pass mouth 12. The by-pass conduit 104c can alternatively be connected to a low-pressure tank 103 from which the means for pumping 101 draw the fluid (a constructional solution visible in FIG. 5), sending the fluid directly to the means for pumping 101 or discharging the fluid outside the hydraulic circuit.

The operation of the by-pass and pressure regulator valve 1 is clear when it is considered to be operatively associated to the above-described pressurised washing plant 100.

Figure 2:
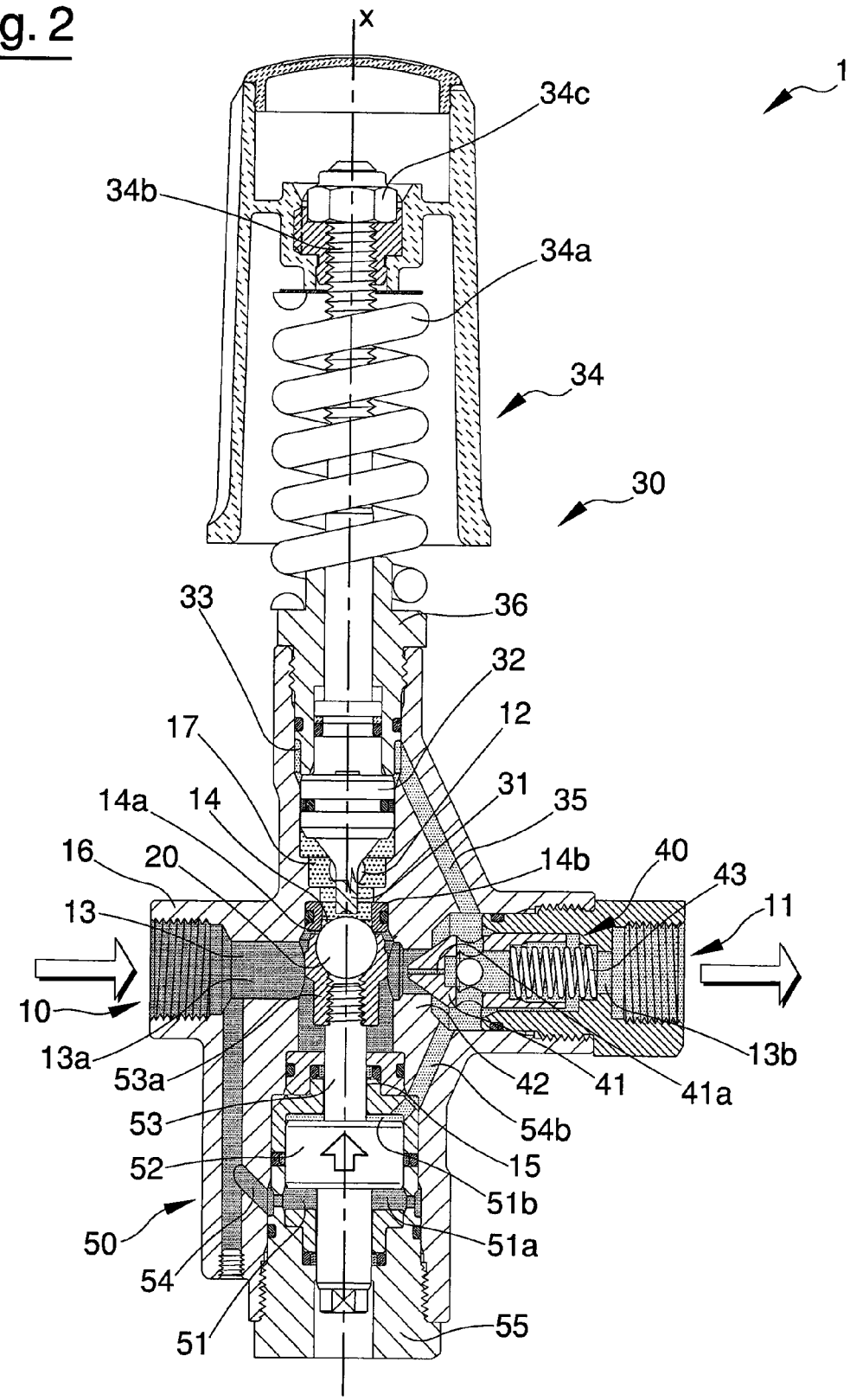
FIG. 2 is an operating scheme of the valve of FIG. 1, with a dispensing gun associated thereto in an open position.

FIG. 2 illustrates the configuration of the valve during dispensing of washing fluid by the dispensing means 102, i.e. with the dispensing gun open. In this condition, a fluid flows through the main conduit 13; the means 40 determine a flow pressure loss in the second tract 13b of the conduit. The fluid pressure in the first tract 13a is thus kept above the pressure in the second tract 13b; the obturator 20 governed by the command means 50 thereof is consequently closed. The by-pass conduit 104c remains closed and the whole washing fluid flow rate arrives at the dispensing means 102.

In the described operating situation, the obturator 20 can however be displaced from the closed position by the operating pressure control means 30. This happens in the case of fluid pressures internal of the main conduit 13 exceeding the threshold level; the opening of the by-pass conduit 104c towards the low-pressure tank 103 thus allows a reduction in the operating pressure. When the pressure returns below the threshold value, the control means 30 no longer exert their action and the obturator 20 is returned into the closed position by the command means 50.

Figure 3:
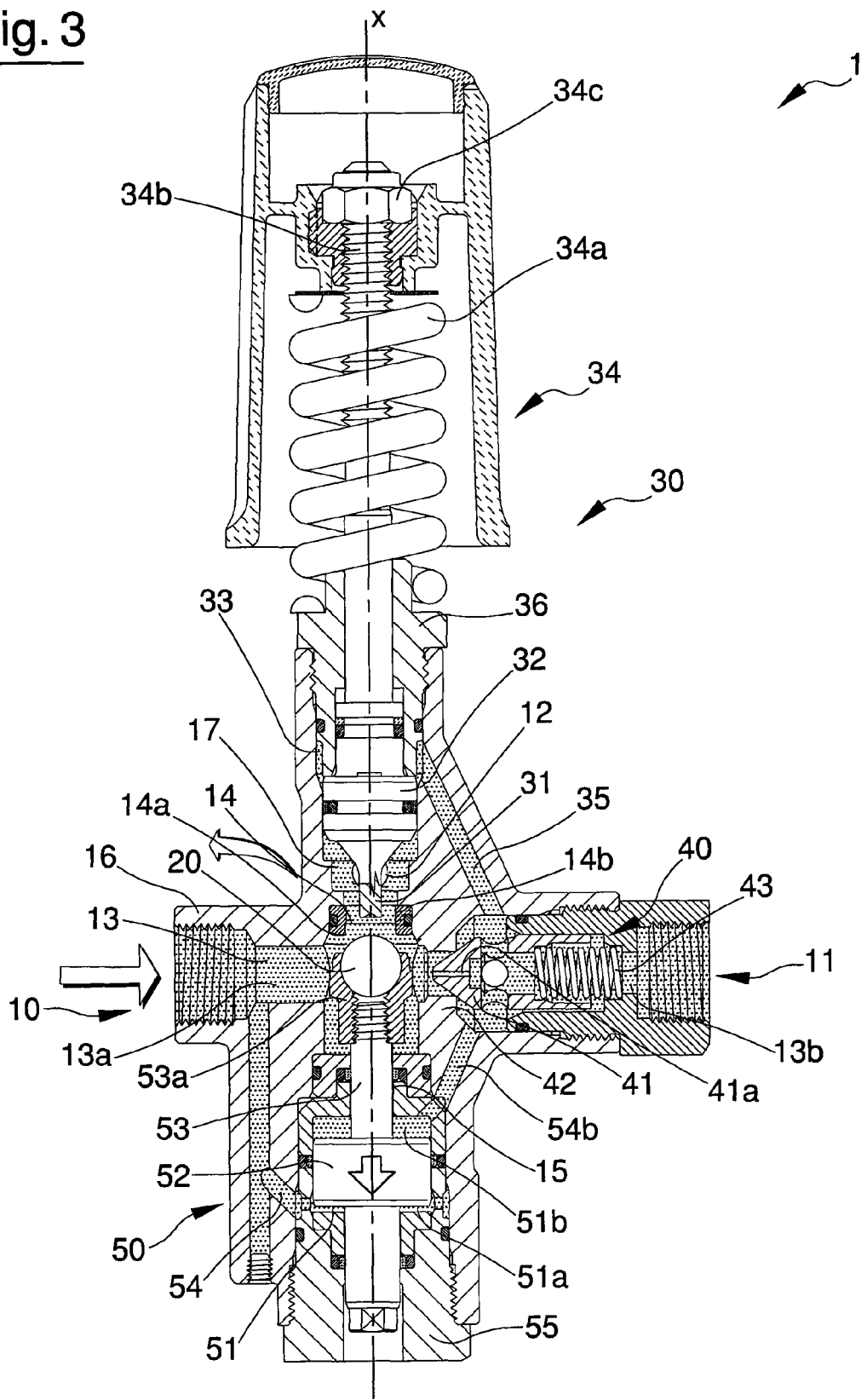
FIG. 3 is an operating scheme of the by-pass and pressure regulator valve of FIG. 1, with a dispensing gun associated thereto in an open position.

FIG. 3 illustrates the configuration of the fluid dispensing stop valve, i.e. with the gun closed. In this operating condition, the fluid flow stops and the flow pressure loss is annulled. There is no maintenance action exerted by the command means 50 on the obturator 20, which thus returns into the open position, enabling outflow of the washing fluid towards the low-pressure tank 103.

Entering into greater detail on the constructional aspects which make possible the obtaining of the previously-described advantages, the conformation of the command means 50 of the obturator 20 are of particular importance. They comprise a cylindrical chamber 51, a pilot piston 52 which is sealedly mobile internally of the cylindrical chamber 51, and a connecting stem 53. The piston separates the cylindrical chamber 51 into a first portion 51a, in direct fluid connection with the first tract 13a of the main conduit 13, and a second portion 51b in direct fluid connection with the second tract 13b of the main conduit 13. The connecting stem 53 solidly connects the pilot piston 52 to the obturator 20.

The cylindrical chamber 51, in contrast with the constructional solutions adopted in the prior art, is separated from the main conduit 13. This constructional solution leads to considerable advantages in terms of regularity of functioning of the device.

In the preferred embodiments of the present invention, the cylindrical chamber 51 is connected to the main conduit 13 by means of a first auxiliary conduit 54, which connects the first portion 51a of the chamber with the first tract 13a of the conduit, and a second auxiliary conduit 54b, which connects the second portion 51b of the chamber with the second tract 13b of the conduit 54.

The obturator 20 is arranged internally of the main conduit 13, and is mobile, in solid connection with the pilot piston 52, along a travel axis x. The travel axis x has a component which is prevalently perpendicular to the development direction of the main conduit 13; preferably, as in the illustrated embodiments, it is perpendicular to the development direction. The connecting stem 53 is sealedly slidable internally of a connecting hole 15 which crosses a separating wall between the main conduit 13 and the cylindrical chamber 51. By locating on a seating 14a in the closed position thereof, the obturator 20 is thus predisposed to occlude an outflow hole 14 opening on the main conduit 13, opposite the connecting hole 15.

In the illustrated embodiment, the obturator 20 is advantageously spherical, and is advantageously connected to an end of the connecting stem 53 by means of a sleeve joint 53a.

The cylindrical chamber 51 extends to below the main conduit 13 internally of which the obturator 20 is arranged; it develops vertically according to the travel axis x. In the absence of a pressure differential between the upper surface and the lower surface of the pilot piston 52 (a situation which obtains in the absence of flow or with the gun closed) the action of the pressure, thanks to the special balancing of the surfaces, will tend to maintain the obturator 20 in the open position. The gravitational action has no influence with respect to the functioning of the valve, which can thus operate in any position, a vertical orientation not being required.

According to the requested operating behaviour, the first portion 51a of the cylindrical chamber 51 is located below the second portion 51b; in this way a fluid pressure which is greater in the first tract 13a of the main conduit 13 determines a force directed upwards on the pilot piston 52, contributing to maintaining the obturator 20 pressed on the seating 14a. The first auxiliary conduit 54 thus enters in proximity of the bottom surface of the cylindrical chamber 51; the second auxiliary conduit 54b enters in proximity of the upper surface.

Constructionally, the cylindrical chamber is obtained by means of at least a first sleeve element 55 inserted sealedly internally of a lower cylindrical housing of a main valve body 16. The seating 14a is also afforded on an annular insert 14b sealedly applied on the main valve body 16; the annular insert 14b also defines the outflow hole 14.

The by-pass and pressure regulator valve 1 of the present invention comprises a low-pressure chamber 17 which connects the by-pass mouth 12 to the outflow hole 14. The operating pressure control means 30 comprise a presser element 31, which is mobile internally of the chamber 17 in a direction which substantially coincides with a direction of the travel axis x. At fluid pressures inside the main conduit 13 in excess of a threshold level, the presser element 31 is predisposed to exert an action which shifts the obturator 20 from the closed position into the open position.

The operation pressure control means 30 further comprise a control piston 32, solidly constrained to the presser element 31, which is sealedly slidable and separates the low-pressure chamber 17 from a control chamber 33 in fluid communication with the main conduit 13. In the illustrated embodiments, the fluid communication is guaranteed by a third auxiliary conduit 35 which connects the control chamber 33 with the second tract 13b of the main conduit. The low-pressure chamber 17 and the control chamber 33 are in the example afforded in the same upper cylindrical housing of the main valve body 16, being subdivided by the control piston 32. The control chamber 33 is closed by a second sleeve element 36, sealedly introduced to close the upper cylindrical housing.

The control means 30 comprise opposing means 34 destined to oppose, with an adjustable intensity, the movement of the control piston 32 in nearing the outflow hole 14. In the preferred embodiments, the opposing means 34 comprise a first compression spring 34a associated to a tie-rod 34b solidly associated to the control piston 32. The tie-rod 34b extends beyond the control chamber 33 and the first compression spring 34a is compressed between an external surface of the second sleeve element 36 and a striker surface opposed thereto. The position of the striker surface is adjustable by means of a regulating nut 34c applied to a threaded end of the tie-rod 34b.

In presence of pressurised fluid in the control chamber 33, a force acts on the control piston 32 which tends to displace the presser element 31 in the direction of the obturator 20; this force however is opposed by a recall force due to the presence of the first compression spring 34a. On exceeding a threshold pressure, the recall action of the spring is no longer sufficient to hold back the piston and the presser element pushes the obturator 20, causing the opening of the by-pass conduit 104c. By manipulating the regulating nut 34c, it is possible to compress or release the spring, thus varying the threshold pressure required to cause the described opening.

The operating pressure control means 30 develop longitudinally along the travel axis x, in opposition to the obturator 50 command means. Thanks to this constructional solution, the two mechanisms, acting on a same obturator 20 are grouped at a single section of the main conduit 13, considerably reducing the size of the by-pass and pressure regulator valve 1. Further, as can be deduced from the above, the obturator 50 command means do not act in opposition to the main compression spring 34a, if not at the moment of exceeding the threshold pressure internally of the main conduit 13; it follows that large induced flow pressure losses are not necessary in order for the device to operate.

In order to enable an accurate calibration of the device of the present invention, the means for determining a flow pressure loss 40 are preferably predisposed to induce a substantially constant flow pressure loss on variation of the fluid flow rate through the main conduit 13, at least for flow rate levels which are not in excess of a maximum limit.

In particular, the means 40 comprise an auxiliary obturator 41, crossed by a passage hole 41a, mobile internally of the main conduit 13 but constrained upstream by the presence of a choke 42, and elastic means predisposed to exert a force directed towards upstream of the conduit on the auxiliary obturator 41. The choke 42 divides the first tract 13a of the main conduit 13 from the second tract 13b. The auxiliary obturator 41 is advantageously conical, tapered in the direction of the choke 42, and the elastic means comprise a second compression spring 43, arranged between the auxiliary obturator 41 and a strike surface.

Operatively, when a fluid flow rate transits from the first to the second tract of the main conduit 13, the pressure on the auxiliary obturator 41 determines a compression, related to the flow rate, of the spring 43 associated thereto. The obturator 41 moves away from the choke 42 and opens an outflow surface which is variable with the flow rate such as to limit the increase of the flow pressure loss during the increase of the flow rate itself. The passage hole 41a, of small diameter, serves to guarantee the fluid communication between the first tract 13a and the second tract 13b of the main conduit 13 in the absence of fluid flow, i.e. when the auxiliary obturator 41 is abutting against the choke 42.

In a constructional variant which is not illustrated, the means for determining a flow pressure loss 40 can be constituted by a simple fixed nozzle arranged between the first and the second tract of the main conduit 13. This solution has the merit of introducing a constructional simplification of the device, though at the cost of operational accuracy.

Figure 4:
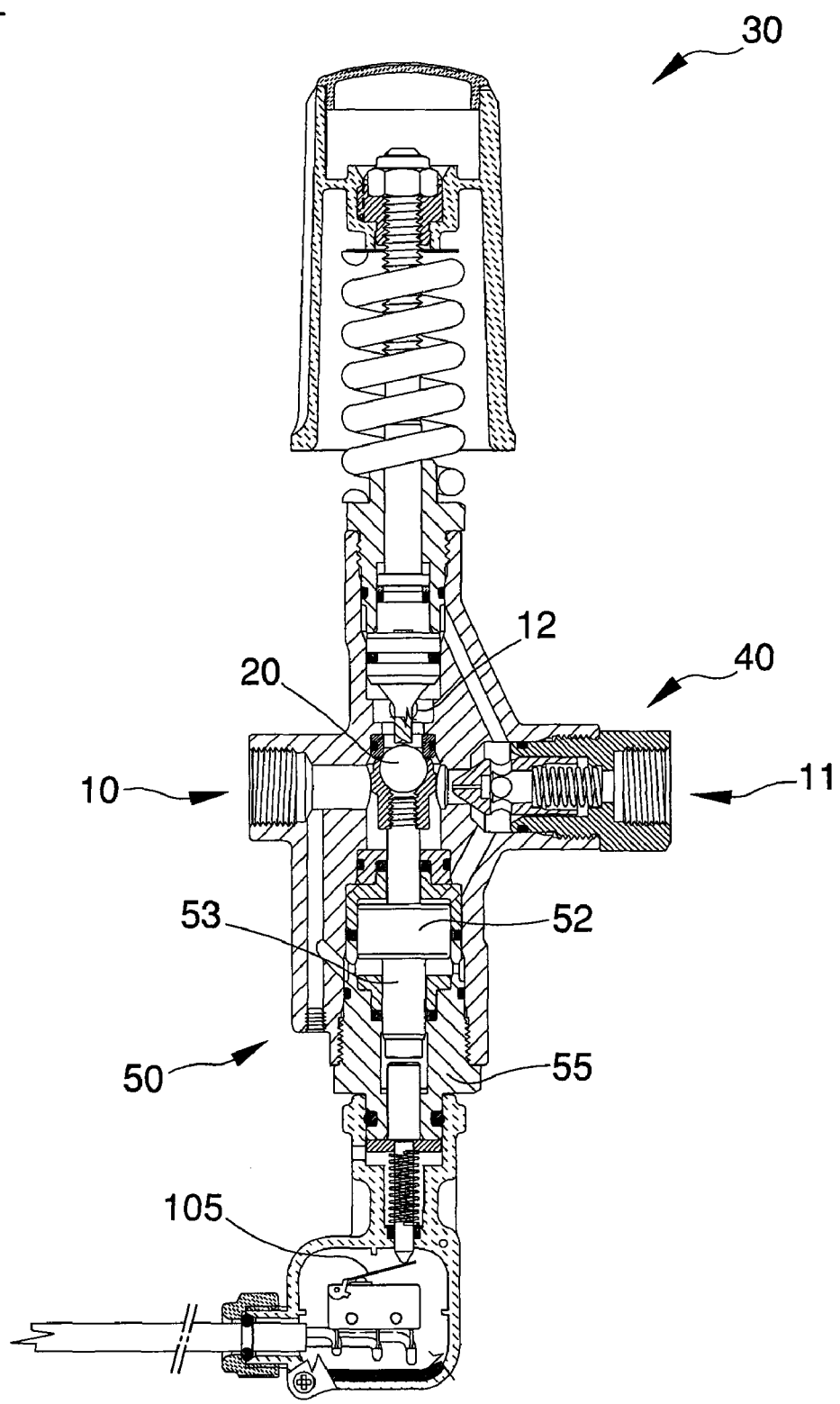
FIG. 4 is a section view of a second embodiment of the by-pass and pressure regulator valve of the present invention.

The alternative embodiment of FIG. 4 comprises a first sleeve element 55 which is different from the one of FIG. 1 in order to enable association of an external transmission element to the connecting stem 53. Thanks to this detail, it is possible to realise a pressurised washing plant 100 of the previously-described type, in which the obturator command means 50 are associated to a micro-switch 105. The micro-switch 105 is predisposed to send an electric signal relating to the position of the obturator 20, thus commanding the turning-on and switching-off of the pumping means 101 or any other electrical or electromechanical device installed in the circuit.

What is claimed is:

1. A by-pass and pressure regulator valve exhibiting: an inlet mouth and an outlet mouth set in reciprocal communication by a main conduit; a by-pass mouth; the by-pass and pressure regulator valve comprising: an obturator, mobile between at least a closed position, in which it interrupts fluid communication between the main conduit and the by-pass mouth, and at least an open position, in which the fluid communication is not interrupted; operating pressure control means, predisposed to move the obturator from the closed position to the open position when fluid pressures internally of the main conduit exceed a threshold level; means for determining a flow pressure loss in fluids crossing the main conduit, arranged along the main conduit in order to separate a first tract upstream of the main conduit from a second tract downstream thereof; wherein it comprises obturator command means governed by a fluid pressure difference between the first tract and the second tract of the main conduit, distinct from the operating pressure control means but operatively connected to the obturator, the obturator command means being predisposed to exert an action on the obturator which maintains said obturator in the closed position thereof when a fluid pressure in the first tract is greater than a fluid pressure in the second tract; wherein the means for determining a flow pressure loss are predisposed to induce a flow pressure loss which is substantially constant on varying the fluid flow rate through the main conduit, at least for flow rate levels which do not exceed a maximum limit and comprise an auxiliary obturator mobile internally of the main conduit but constrained upstream by a presence of a choke, and elastic means predisposed to exert a direct force in an upstream direction of the main conduit on the auxiliary obturator, wherein a passage hole extends through the auxiliary obturator.

2. The by-pass and pressure regulator valve of claim 1, wherein the obturator command means comprise: a cylindrical chamber; a pilot piston, sealedly mobile internally of the cylindrical chamber, which separates the chamber into a first portion in direct fluid communication with the first tract of the main conduit and a second portion in direct fluid communication with the second tract of the main conduit; a connecting stem which solidly connects the piston to the obturator.

3. The by-pass and pressure regulator valve of claim 2, wherein the cylindrical chamber is separated from the main conduit, and is connected thereto by means of a first auxiliary conduit which connects the first portion of the chamber with the first tract of the conduit, and a second auxiliary conduit which connects the second portion of the chamber with the second tract of the conduit.

4. The by-pass and pressure regulator valve of claim 3, wherein the obturator is arranged internally of the main conduit and is mobile, in solid constraint with the pilot piston, along a travel axis; the travel axis having a component which is prevalently perpendicular to a development direction of the main conduit; the connecting stem being sealedly slidable internally of a connecting hole which crosses a separating wall between the main conduit and the cylindrical chamber; the obturator being predisposed to occlude, by striking on a seating in a closed position thereof, an outflow hole which opens on the main conduit and which is opposite the connecting hole.

5. The by-pass and pressure regulator valve of claim 4, wherein it comprises a low-pressure chamber which connects the by-pass mouth to the outflow hole; the operating pressure control means comprising a presser element, mobile internally of the low-pressure chamber along a direction which substantially coincides with the direction of the travel axis and predisposed to exert, on contact and at fluid pressures internal of the main conduit which exceed a threshold value, an action which moves the obturator from the closed position into the open position.

6. The by-pass and pressure regulator valve of claim 5, wherein the operating pressure control means comprise a control piston which is solidly constrained to the presser element and which is sealedly slidable and separates the low-pressure chamber from a control chamber in fluid communication with the main conduit; the operating pressure control means further comprising means for opposing destined to oppose the movement of the control piston in a nearing direction to the outflow hole with an adjustable intensity.

7. A pressurised washing plant comprising pumping means of a washing fluid, dispensing means of the washing fluid and a low-pressure by-pass conduit; wherein it further comprises the by-pass and pressure regulator valve of any one of the preceding claims, the inlet mouth of the by-pass and pressure regulator valve being in fluid communication with the pumping means, the outlet mouth being in communication with the dispensing means and the by-pass mouth being associated to the low-pressure by-pass conduit.

8. The pressurised washing plant of claim 7, wherein the obturator command means are associated to a micro-switch predisposed to send an electric signal relating to a position of the obturator, thus commanding switching-on and turning-off of the pumping means or other electromechanical devices.

* * * * *